United States Patent
Shin

[11] Patent Number: 5,828,279
[45] Date of Patent: Oct. 27, 1998

[54] DEGAUSSING COIL HOLDER FOR CATHODE RAY TUBE

[75] Inventor: Kwang-cheal Shin, Anyang, Rep. of Korea

[73] Assignee: Samsung Electronics Co., Ltd., Kyungki-do, Rep. of Korea

[21] Appl. No.: 694,115

[22] Filed: Aug. 8, 1996

[30] Foreign Application Priority Data

Sep. 30, 1995 [KR] Rep. of Korea ................ 1995-34004

[51] Int. Cl.⁶ .............. H01H 1/00; H01H 5/00; H01H 47/00; H01F 13/00
[52] U.S. Cl. .................. 335/214; 361/150; 315/8
[58] Field of Search ........................ 335/214; 361/150; 315/8; 248/56, 62, 68.1, 74.3

[56] References Cited

U.S. PATENT DOCUMENTS

| | | | |
|---|---|---|---|
| 649,270 | 5/1900 | Collins | 248/62 |
| 706,903 | 8/1902 | Crawford | 248/62 |
| 1,362,244 | 12/1920 | Farley | 248/62 |
| 2,397,279 | 3/1946 | Vesconte | 248/74.3 |
| 3,224,054 | 12/1965 | Lige | 24/16 PB |
| 4,862,560 | 9/1989 | Lichtenberg | 24/16 PB |

*Primary Examiner*—Michael L. Gellner
*Assistant Examiner*—Raymond Barrera
*Attorney, Agent, or Firm*—Sughrue, Mion, Zinn, Macpeak & Seas, PLLC

[57] ABSTRACT

A holder for supporting a degaussing coil on a cathode ray tube. The degaussing coil holder is a flexible sheet having holes formed in each end to receive a lug of the cathode ray tube.

6 Claims, 5 Drawing Sheets

DEGAUSSING COIL HOLDER FOR CATHODE RAY TUBE

BACKGROUND OF THE INVENTION

1. Field of the Invention

The present invention relates to a degaussing coil holder for a cathode ray tube, and more particularly, to a degaussing coil holder for a cathode ray which is easy to manufacture and which reliably holds the degaussing coil.

2. Description of the Related Art

When a cathode ray tube is installed in a television or a monitor, a degaussing coil for removing undesirable accumulated electrical charge and the related magnetic field is also installed. FIG. 1 illustrates a television employing a conventional degaussing coil holder, and FIG. 2 illustrates in detail how the degaussing coil is supported by the holder shown in FIG. 1. The cathode ray tube 20 is fixed to a television case 10 by a screw 50 passing through a hole 21a of a lug 21 provided on edge portions of the cathode ray tube 20. A degaussing coil 60 is supported by holders 40 which respectively are connected to each lug 21 so that the degaussing coil 60 is installed to the rear side of the cathode ray tube 20 before the cathode ray tube 20 is fixed to the case 10. Each of the holders 40 have an elastic support 41, manufactured by injection molding, which is elastically deformed when the degaussing coil 60 is inserted thereon and an insertion hole 42 formed to receive the lug 21 of the cathode ray tube 20 therein.

However, since the conventional degaussing coil holder 40 is manufactured by an injection molding process, manufacturing costs are relatively high. Also, it is not easy to insert the degaussing coil 60 into the elastic support 41 in order to install the degaussing coil 60 to the cathode ray tube 20 using the holder 40. Therefore, assembly of the television is difficult.

SUMMARY OF THE INVENTION

Accordingly, it is an object of the present invention to provide a degaussing coil holder for a cathode ray tube which easily and reliably holds a degaussing coil and which reduces manufacturing costs.

To accomplish the above object, there is provided a degaussing coil holder for a cathode ray tube which is coupled with a lug of the cathode ray tube, for supporting a degaussing coil with respect to the rear side of the cathode ray tube. The degaussing coil holder has two ends which overlap with each other to wrap around the degaussing coil. A lug insertion hole for receiving a lug of the cathode ray tube is formed on each end of the degaussing coil holder.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Figure 1:
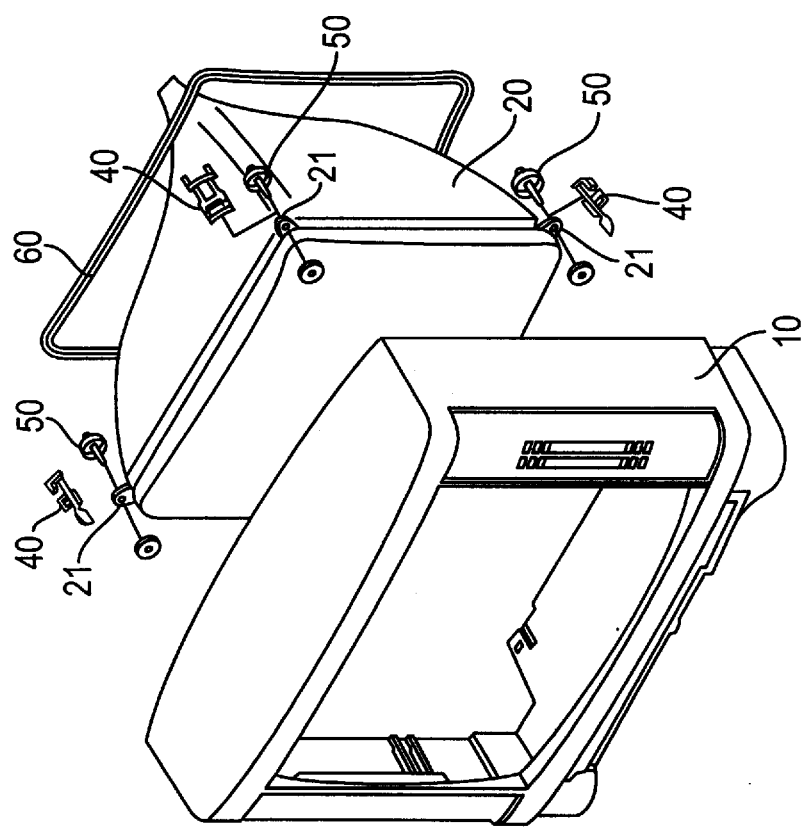
FIG. 1 is a schematic exploded perspective view of a television employing a conventional degaussing coil holder.
Figure 2:
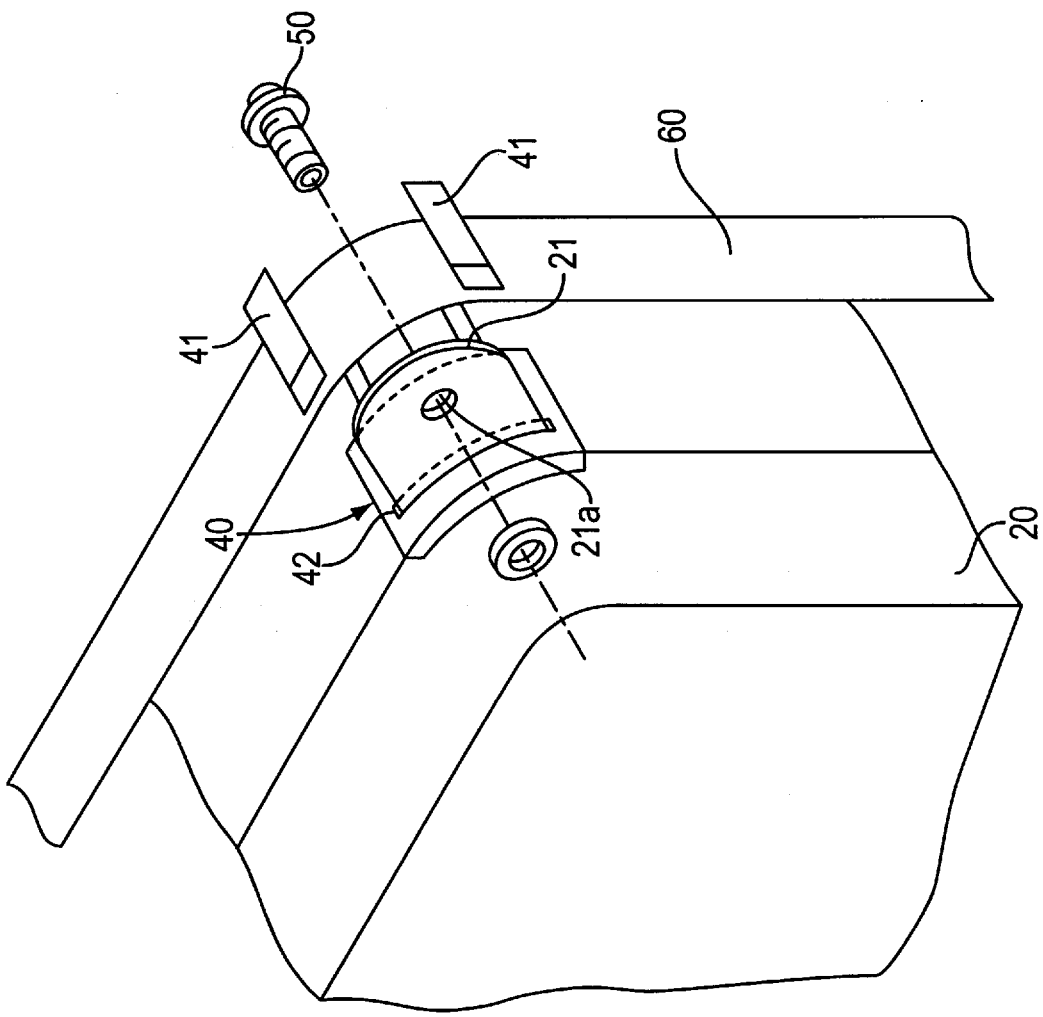
FIG. 2 is a detailed exploded perspective view of the television of FIG. 1 in a state wherein the degaussing coil is supported by the holder.
Figure 3:
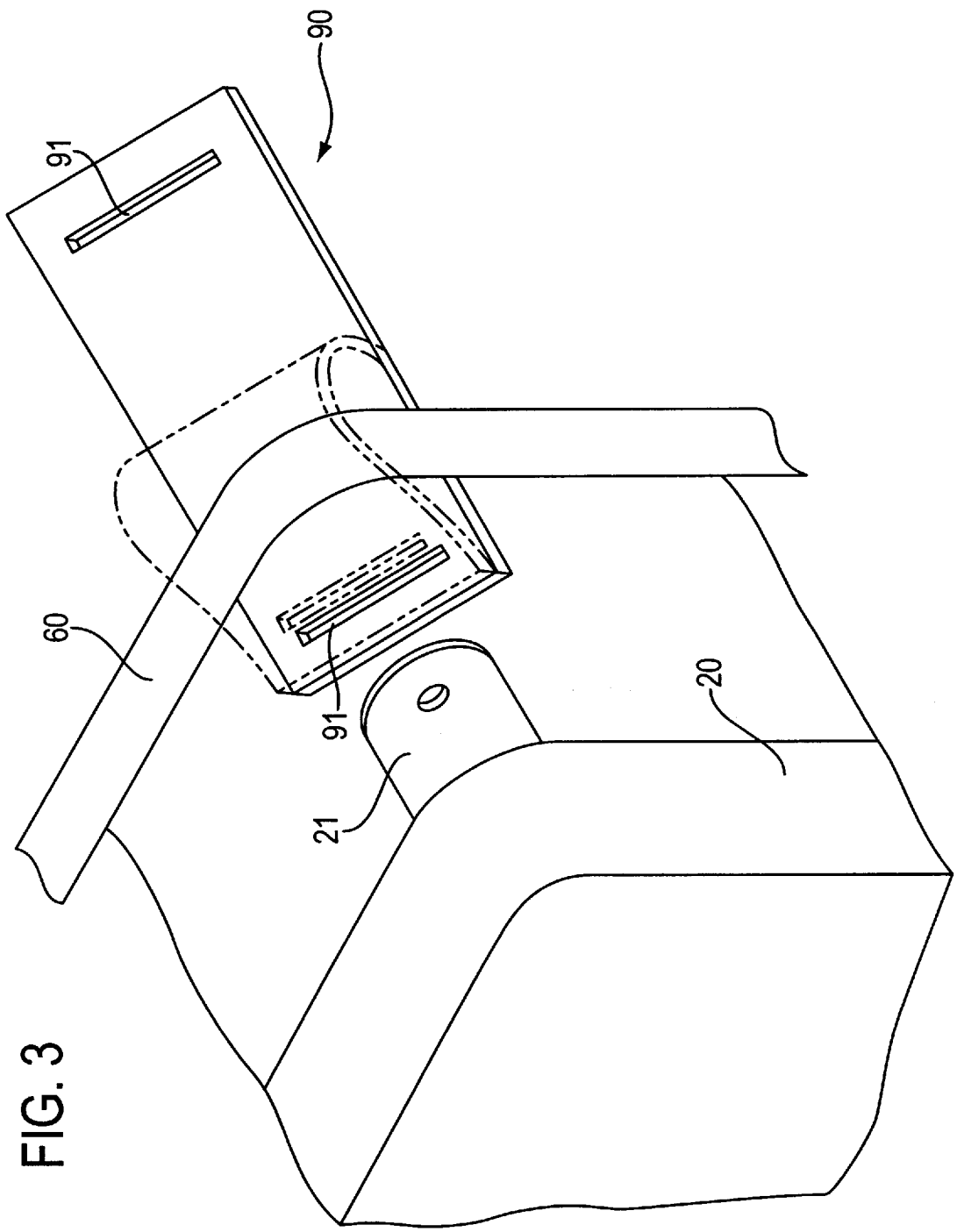
FIG. 3 is a partial exploded perspective view of a cathode ray tube illustrating a degaussing coil holder according to a preferred embodiment of the present invention.

Referring to FIGS. 3 and 41 a degaussing coil holder 90 for a cathode ray tube according to a preferred embodiment of the present invention is comprised of a flexible film folded so that both ends overlap with each other as shown by a double-dotted line in FIG. 3. A lug insertion hole 91 for receiving the lug 21 of the cathode ray tube 20 is formed in each end of the holder 90. Since the holder 90 is manufactured by punching a flexible material sheet, material and production costs for the holder 90 can be reduced, compared with the conventional degaussing coil holder 40 which must be manufactured by injection molding.

Figure 4:
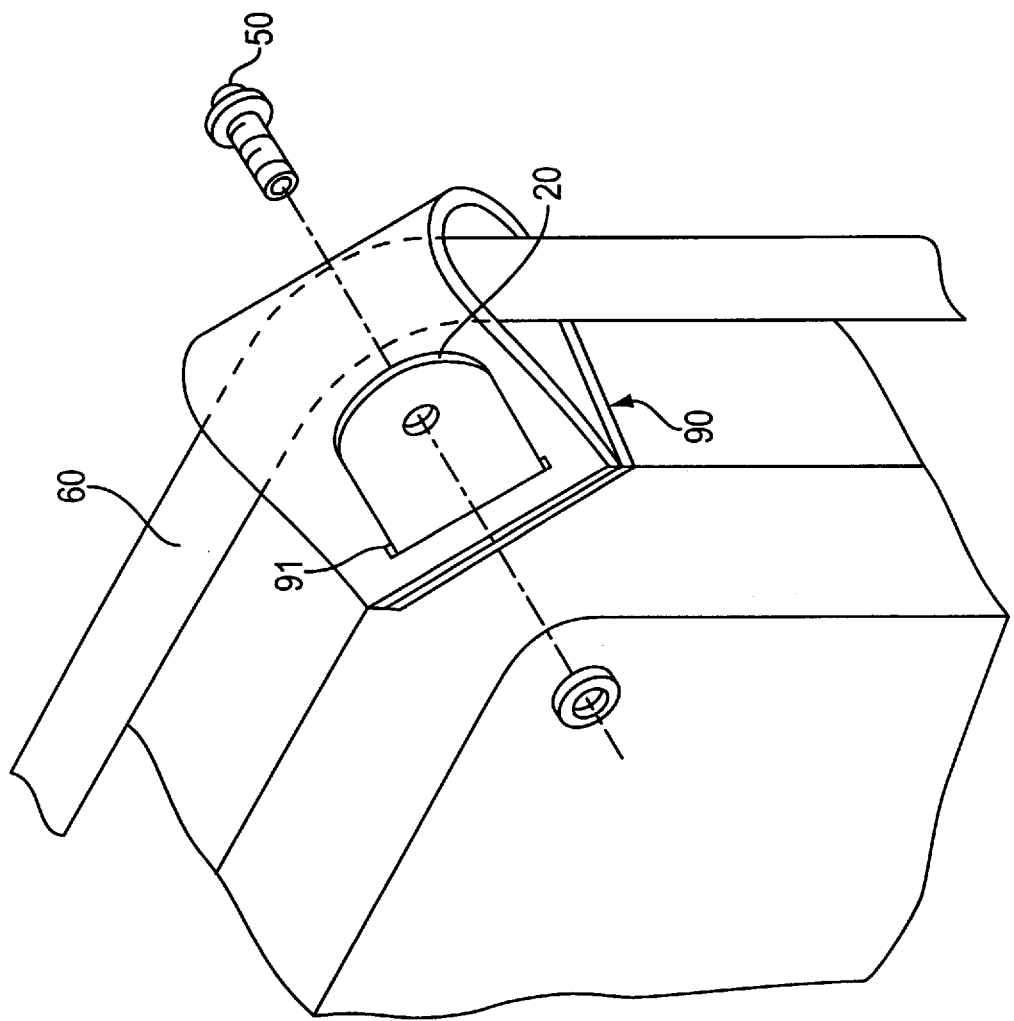
FIG. 4 is a schematic exploded perspective view of the preferred embodiment in a state wherein the degaussing coil is supported by the degaussing coil holder.

A process of installing the degaussing coil 60 to the cathode ray tube using the degaussing coil holder 90 will be described below. As shown by a solid line in FIG. 3, the degaussing coil 60 is placed in a central portion of the body of the holder 90. Then, as shown by the double-dotted line, the holder 90 is folded over the coil 60. Accordingly, the degaussing coil 60 is wrapped in the folded holder 90. Further, as shown in FIG. 4, the lug 21 of the cathode ray tube 20 is inserted into the lug insertion holes 91 formed on the overlapping ends of the holder 90 which surrounds the degaussing coil 60. Accordingly, the degaussing coil 60 is held and supported by the holder 90 coupled with the lug 21 of the cathode ray tube 20.

As described above, in the case of the degaussing coil holder 90 for the cathode ray tube 20 according to the preferred embodiment of the present invention, the degaussing coil 60 is wrapped in the holder 90, and can be held and supported only by inserting the lug 21 into the lug insertion holes 91 formed at both ends of the holder 90. Thus, since it is unnecessary to forcibly insert the degaussing coil 60 into the elastic support 41, as in the case of the conventional holder 40, the degaussing coil 60 can easily be installed.

Figure 5:
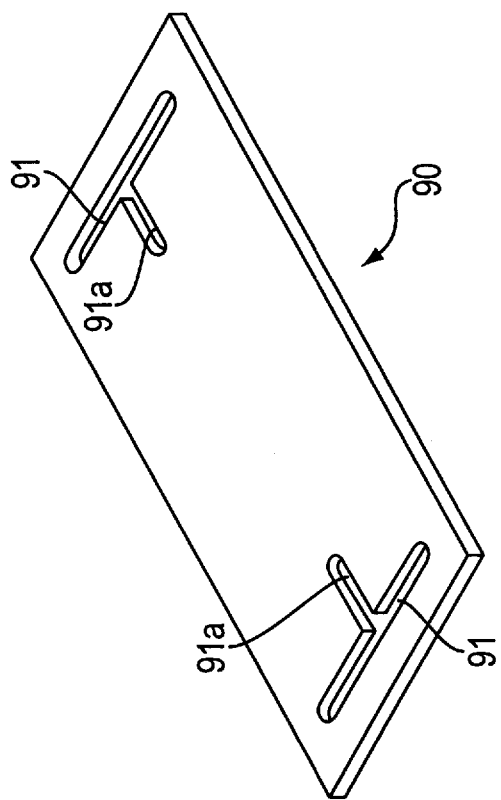
FIG. 5 is a schematic perspective view of a degaussing coil holder according to another preferred embodiment of the present invention.

According to the holder 90 of the preferred embodiment, each lug insertion hole 91 is formed to be a straight line corresponding to the shape of the lug 21 of the cathode ray tube. However, it is not necessary to form the lug insertion holes 91 in such a manner. For example, as shown in FIG. 5, it is possible to form an auxiliary insertion hole 91a extending perpendicularly from the center of the lug insertion hole 91 in order to facilitate insertion of the lug 21 into the lug insertion hole 91.

The degaussing coil holder of the present invention reduces manufacturing costs and allows the degaussing coil to be installed easily to the rear side of the cathode ray tube.

The invention has been described through preferred embodiments. However, various modifications can be made without departing from the scope of the invention, as defined by the appended claims.

What is claimed is:

1. In combination with a degaussing coil and a cathode ray tube having a lug, a degaussing coil holder for coupling said degaussing coil to said cathode ray tube, said degaussing coil holder comprising a flexible sheet having two ends and a hole formed in each of said two ends, said holes receiving said lug formed on said cathode ray tube.

2. A degaussing coil holder according to claim 1, wherein said ends are angled toward each other without being bent.

3. A degaussing coil holder according to claim 1, wherein said sheet is folded around said degaussing coil so that said holes are superposed over one another to receive said lug.

4. A degaussing coil holder according to claim 3, wherein an auxiliary hole is formed in said sheet proximate each of said holes, each of said auxiliary holes communicating with a respective one of said holes.

5. A degaussing coil holder according to claim 4, wherein each of said auxiliary holes is an elongated slit.

6. A degaussing coil holder according to claim 3, wherein said holes are elongated slots.

\* \* \* \* \*